United States Patent [19]
Engdahl et al.

[11] Patent Number: 5,618,443
[45] Date of Patent: Apr. 8, 1997

[54] CLARIFICATION OF GREEN LIQUOR BY FALLING FILM CROSS-FLOW FILTRATION

[75] Inventors: Holger Engdahl; Pekka Tormikoski, both of Savonlinna, Finland

[73] Assignee: Ahlstrom Machinery Oy, Helsinki, Finland

[21] Appl. No.: 434,689

[22] Filed: May 4, 1995

Related U.S. Application Data

[63] Continuation-in-part of Ser. No. 433,348, May 4, 1995.

[51] Int. Cl.$^6$ .............................. B01D 37/00; B01D 29/00
[52] U.S. Cl. ..................... 210/767; 210/791; 210/805; 210/188; 210/194; 210/197; 210/323.2; 210/332; 210/409; 210/416.1; 210/456; 162/30.11
[58] Field of Search ..................................... 210/767, 791, 210/800, 805, 808, 348, 323.2, 384, 391, 405, 409, 412, 416.1, 188, 194, 197, 332, 456; 162/30.11

[56] References Cited

U.S. PATENT DOCUMENTS

| | | |
|---|---|---|
| 3,696,933 | 10/1972 | Pall et al. . |
| 3,835,999 | 9/1974 | Moore . |
| 5,008,009 | 4/1991 | Ciaffoni . |

FOREIGN PATENT DOCUMENTS

| | | |
|---|---|---|
| 500109 | 2/1992 | European Pat. Off. . |
| 1290159 | 9/1972 | United Kingdom . |
| 1374109 | 11/1974 | United Kingdom . |
| 1466094 | 3/1977 | United Kingdom . |

OTHER PUBLICATIONS

Engdahl et al, "Clarification of Green Liquor by a Falling Film . . .", Paper and Timber vol. 76/No. 5/1994, pp. 326–329, May 24, 1994.

*Primary Examiner*—Robert J. Popovics
*Attorney, Agent, or Firm*—Nixon & Vanderhye P.C.

[57] ABSTRACT

A filtering method and apparatus pass the suspension (e.g. green liquor) to be filtered in a falling film down a first side of a filtering surface of a filter element at a different (higher) pressure than a second side, so that due to the pressure difference prevailing across the filtering surface the filtrate flows through the filtering surface and separated solids substantially remain in the suspension, without forming an undesirable solids layer on the filtering surface. A uniform liquid film falling on the filtering surface is generated by recirculating suspension from the bottom of the filter housing to an upper portion of the filter element. Nozzles may direct flow toward the filtering surface in localized areas. The method may be practiced continuously or in batches.

30 Claims, 3 Drawing Sheets

CLARIFICATION OF GREEN LIQUOR BY FALLING FILM CROSS-FLOW FILTRATION

CROSS REFERENCE TO RELATED APPLICATION

This application is a continuation-in-part of application Ser. No. 08/433,348 filed May 4, 1995 now allowed.

BACKGROUND AND SUMMARY OF THE INVENTION

The present invention relates to a method of filtering suspension and an apparatus for realizing that method. The present invention may be applied for filtering green liquor containing finely divided matter, generated, for example, in the chemical circulation of a cellulose pulp mill.

A significant subprocess in the manufacture of sulphate cellulose pulp is the recovery of cooking chemicals. Part of the regeneration is formed by the manufacture of white liquor by causticizing, so that lime milk and green liquor are allowed to react in order to form lime sludge and white liquor. The green liquor is generated when a chemical melt containing sodium chemicals is led from the bottom of the furnace of a soda recovery boiler to a separate dissolving vessel, in which the melt is dissolved in a dilute liquor. The most significant sodium chemicals of the green liquor are sodium carbonate and sodium sulphide. The green liquor also contains insoluble compounds, such as metal oxides, silicates, soot and other impurities. The dregs containing impurities must be discharged from chemical circulation, since the dregs otherwise concentrate in the chemical circulation and disturb the manufacture of white liquor by causticizing. The cleaning of green liquor is generally performed in clarifiers. When the mills become larger and the environmental regulations more stringent cleaning by sedimentation principle results in large apparatus, the diameters of which exceed 30 meters. Moreover, clarifiers are always liable to disturbances, so that green liquor that is insufficiently pure may result even when correctly dimensioned apparatus is used.

An alternative method is to clean green liquor by filtering. Since the dregs mainly consist of finely divided matter, the filterability of which is poor and which rapidly clog the filtering surface, this method employs a filtering apparatus which has a large surface area and is thus expensive. A cake containing fine particles must thus often be removed from the filtering surface so that the filter remains efficient. When such a cake is washed off, a very dilute sludge is obtained, which must be further concentrated in several process stages.

In order to improve the filterability of, for example, lime sludge obtained from the causticizing process, a filtration aid may be used, by means of which a filtering layer having good filtering capacity when filtering finely divided green liquor is formed on the surface of the filter element. This procedure, however, results in additive costs and in an increased amount of waste being transported to a landfill site.

The filterability of a suspension, which is difficult to filter, has also been suggested to be improved in such a way that the formation of a filter cake on the filtering surface is prevented by removing separated solids by causing a strong shear force on the suspension close to the filtering surface, which mixes solids back to the suspension to be filtered. The problem with this cross-flow filtration has been the need to use large liquid volumes to be circulated in order to generate sufficient velocity and turbulence to remove the separated solids from the filtering area.

The purpose of the present invention is to provide a filtering method and apparatus, by which the disadvantages discussed above may be eliminated. The present invention provides a simpler and more economical method and apparatus for filtering liquid-solids suspensions, especially those which have so far been difficult to filter. Although the background of the problem has been discussed above in view of green liquor and the invention is particularly applicable thereto, it is only an example and the invention may be applied for filtering other liquid-solids suspensions, such as kaolin sludge, clarified white liquor, soda liquor, bleaching effluent of cellulose pulp production, liquids containing pulp fines at pulp mills, and liquids containing metal hydroxides.

In the filtering method of the invention the suspension to be filtered is brought into contact with the filtering surface of the filter element in a manner such that due to the pressure difference across the filtering surface the filtrate flows through the filtering surface and the separated solids substantially remain in the suspension. It is a characteristic feature of the invention that the suspension to be filtered is caused to flow downwardly on the filtering surface, so that filtration takes place from the film flowing on the filtering surface.

An apparatus in accordance with the present invention comprises a plurality of filter elements; the filtrate flows through the filtering surface of each while the separated solids substantially remain in the suspension, so that the filter is provided with at least a structure for passing the suspension to be filtered to the filtering surfaces and for removing the filtrate. It is a characteristic feature of the invention that the structure for passing the suspension to be filtered are positioned in such a way that the suspension is brought to an upper portion of each filtering surface to flow downwardly on the filtering surface. According to one preferred embodiment a filter is provided with means for recirculating the non-filtered suspension to an upper portion of the filtering surface.

The present invention realizes cross-flow filtration in a novel manner, such that shear forces preventing generation of solids cake on the filtering surface are formed by passing suspension to be filtered down the filtering surface to flow due to the gravitational force during filtration. Due to a pressure difference between different sides of the filtering surface part, of the liquid is filtered from the falling film through the filtering surface.

A continuous downwardly flowing liquid film is most suitably generated by recirculating non-filtered suspension to an upper portion of the filtering surface and the suspension to be filtered is supplied to and mixed with the circulation flow. The generation of a uniform liquid film on the filtering surface requires rather large liquid volumes (flow rates), generally larger than the amount of liquid which typically flows into the apparatus, therefore the recirculation of the suspension is highly desirable for efficient filtration.

Filter elements according to the present invention are preferably in the form of lamellas, tubes and/or discs. Usually the filtrate is discharged through a filter channel inside the element, such as a tube. If desired, the suspension to be filtered may be passed into the element, so that the filtration takes place in an opposite direction.

The separated solids tend to accumulate on the filtering surface. By maintaining the flow velocity high enough the generation of the solids layer may be completely prevented, since separating solid particles are entrained with the falling liquid. If a solids layer appears to be generating, it may be prevented or removed by lowering the pressure difference across the filter surface for a short period of time (e.g. a few minutes) so that the flow through the filtering surface ends or slows down and the "grip" of the layer from the filtering surface loosens, and when the downward flow loosens it, it flows with the suspension. In order to remove the harmful solids cake the volume of flow in the falling film may be intensified locally (e.g. in one or more restricted areas at a time); the increase of the flow may be generated by means of one or more liquid jets, for example.

The attachment of solids on the filtering surface may also be prevented by vibration using known mechanical or acoustical vibrating equipment.

The suspension to be filtered is typically distributed on the filtering surface in the same way as in conventional falling film evaporators, such as those sold by A. Ahlstrom Corporation of Helsinki, Finland. The suspension to be filtered is fed to a liquid distribution tray—having a bottom with evenly spaced perforations (openings)—mounted above the filter surfaces, and flows from the tray evenly over the filter.

The pressure difference across the filtering surface may be generated by joining the filter to conventional vacuum generating apparatus, such as a vacuum pump. The filter elements may thereby be assembled in an atmospheric pressure vessel or completely open to the atmosphere.

A required pressure difference may alternatively or additionally be maintained by pressurizing a filter in a pressure vessel with gas. The gas may be provided in a closed circulation system. The applied gas may be inert or reactive relative to the suspension to be filtered. Reactive gas is added, when so desired, during the filtration in order to realize desired chemical reactions.

Gas which might penetrate the filtering surface may be separated from the filtrate either in the filter element itself by removing it from a separate conduit than the filtrate, or (more preferably) from above the liquid surface through the upper part of the element, or in a separate vessel outside and distinct from the filter.

The filtration may take place either continuously or in batches. In continuous filtration new suspension is supplied, and thickened suspension is discharged, continuously. If however, dregs as clean as possible are desired (which for green liquor means efficient alkali removal from the dregs), it is possible to perform the filtration in batches.

In batch processes non-filtered suspension is not discharged continuously, but the feed of the suspension is stopped during filtration and the suspension is allowed to be thickened by recirculating. Thereafter wash water is supplied to the filter and filtration continues. The wash water, which mixes with the dregs, removes impurities (e.g. alkali) from the dregs. At the same time the water penetrating the filtering surface washes the filtering surface improving the filtration capacity. The dregs are removed as sludge to be further treated and a new filtration cycle may be begun.

An even more efficient treatment of dregs is provided, if a dregs cake is formed for washing. The apparatus according to the invention may be provided with a separate sludge vessel. A recirculation pump draws the suspension to be recirculated from the sludge vessel (to which the sludge flows from the bottom of the filter). The process is initiated by filling the sludge vessel with virgin suspension to be filtered, whereafter the recirculation and filtration of the suspension is started. Sludge from the filter is not removed from the sludge vessel, but rather is allowed to thicken there, which takes place when liquid is removed as filtrate. When the solids content of the sludge is at the desired level, the bottom conduit of the filter is closed and the filter is allowed to be filled with sludge. The pressure difference across the filter surface still prevails in a full filter, whereby liquid infiltrates through the filtering surface, on which a solids cake is generated. After filtration the sludge remaining between the filter elements or otherwise in the filter housing is removed and brought back to the sludge vessel. When the bottom of the filter is closed, a dregs cake remains due to the pressure difference on the surface of the elements. The gas flowing through the cake and the filter element removes humidity, drying the dregs cake. The generated cake is removed by washing with water and blowing with gas to be passed for further treatment (washing and drying). This entire procedure provides for very efficient treatment of dregs by the formation of a dregs cake.

In connection with a batch process as described above it is possible to carry out dregs washing with very efficient displacement washing techniques. In the art it has been typically necessary to carry out the dregs washing in separate apparatus. Washing according to the invention takes place by filling the filter housing with water after the dregs cake is dried, and then by discharging the filtered water to a washing water vessel. The cake is finally removed, as above, by washing with water and blowing with gas and the dregs-water mixture is passed from the filter housing to further treatment. The dried cake may alternatively be removed from the open bottom of the filter housing simply by blowing with air or other gas.

Thus, if so desired, according to the invention the entire treatment of the material to be filtered (such as green liquor) may be performed in the same apparatus (filter housing).

In batch process it is possible to adjust the capacity by pressure difference or by extending the interval between the cycles.

According to one aspect of the present invention, a method of filtering a suspension of solids in a liquid, using a filter surface having first and second sides and a generally vertical orientation, is provided. The method comprises the steps of (a) Causing the suspension to flow in a falling film down the first side of the filter surface. (b) Providing a higher gas pressure on the first side of the filter surface than on the second side of the filter surface, so that filtrate passes through the filter surface to the second side of the filter surface, while solids remain in the liquid flowing down the filter surface first side. (c) Withdrawing the filtrate away from the filter surface. And, (d) withdrawing the liquid with suspended solids away from the filter surface.

Step (b) may be practiced by supplying gas under superatmospheric pressure to the first side of the filter surface and/or by applying a partial vacuum to the second side of the filter surface. Partial vacuum and gas pressurization may be provided by using a vessel having an inlet, outlet, gas volume, and a compressing device connected to the outlet, in which case step (b) is practiced by causing gas from the second side of the filter surface to pass into the vessel through the vessel inlet, to pass out of the vessel through the vessel outlet, to be compressed by the gas compressing device, and then to pass toward the first side of the filter surface. The filter surface has a top and a bottom and step (a) is typically practiced by recirculating the liquid from step (d) from adjacent the bottom to adjacent the top, to flow in a falling film down the filter surface. The gas that is supplied may be gas that is inert to the suspension, or chemically reacts with the suspension.

Then there may be the further step (e) of locally intensifying rate or volume of falling film flow of suspension over the first side of the filter surface so as to substantially preclude the formation of a solids cake on the filter surface. Step (e) may be practiced by directing one or more liquid jets toward the filter surface first side. Alternatively, the prevention of the formation of a solids cake may be practiced by at least occasionally vibrating the filter surface either mechanically or acoustically.

Steps (a) through (d) may be practiced continuously or in batches, and where the suspension being filtered is green liquor the ratio of the flow velocity V to the average filtrate flow velocity $V_s$ through the filter surface is at least 5:1 (preferably about 8:1). During batch filtration, in which there is continuous recirculation but no introduction of virgin suspension, the dregs may be washed in the filter housing, and/or the dregs may be removed dry by blowing air or other gas through the inside of the filter elements to force the dregs cake to the bottom of the filter vessel from which it can be removed by opening the bottom of the vessel.

According to another aspect of the invention, a method of cleaning green liquor using a filter surface having first and second sides and a generally vertical orientation, is provided. The method comprises the steps of: (a) Causing the green liquor to flow in a falling film down the first side of the filter surface. (b) Providing a higher gas pressure on the first side of the filter surface than on the second side of the filter surface, so that filtrate passes through the filter surface to the second side of the filter surface, while solids remain in the liquid flowing down the filter surface first side. (c) Withdrawing the filtrate away from the filter surface. And, (d) withdrawing the green liquor away from the filter surface.

According to another aspect of the present invention a filtering apparatus is provided comprising the following components: A housing. A plurality of filter elements generally vertically mounted in the housing, and including a top and a bottom. Each filter element comprising a filter surface with first and second sides. Means for providing a higher gas pressure on the first sides of the filter surfaces with respect to the second sides. A first conduit for withdrawing filtrate from the second side of at least one of the surfaces. A second conduit for withdrawing suspension liquid from adjacent the bottom of the elements. And, means for introducing suspension into said first sides of the surfaces to flow in a falling film down the first sides.

The apparatus may also comprise a sludge vessel connected to the second conduit external of the housing, and an open dregs vessel distinct from the sludge vessel connected to a bottom portion of the housing. Recirculating means are typically provided for recirculating suspension from the sludge vessel to the introducing means, and the introducing means may comprise a tray with perforated bottom mounted above the filter element. The introducing means may also or alternatively comprise at least one nozzle for directing suspension onto at least one of the filter surface first sides. When the housing is gas-tight gas pressure providing means comprise means for introducing gas under pressure into the housing. The gas pressure providing means may alternatively or additionally comprise means for applying a partial vacuum to the filter surface second sides. There may also be means for withdrawing gas from the second sides of the filter surfaces distinct from the first conduit, or for simultaneously withdrawing gas and filtrate through the first conduit.

DETAILED DESCRIPTION OF THE DRAWINGS

Figure 1:
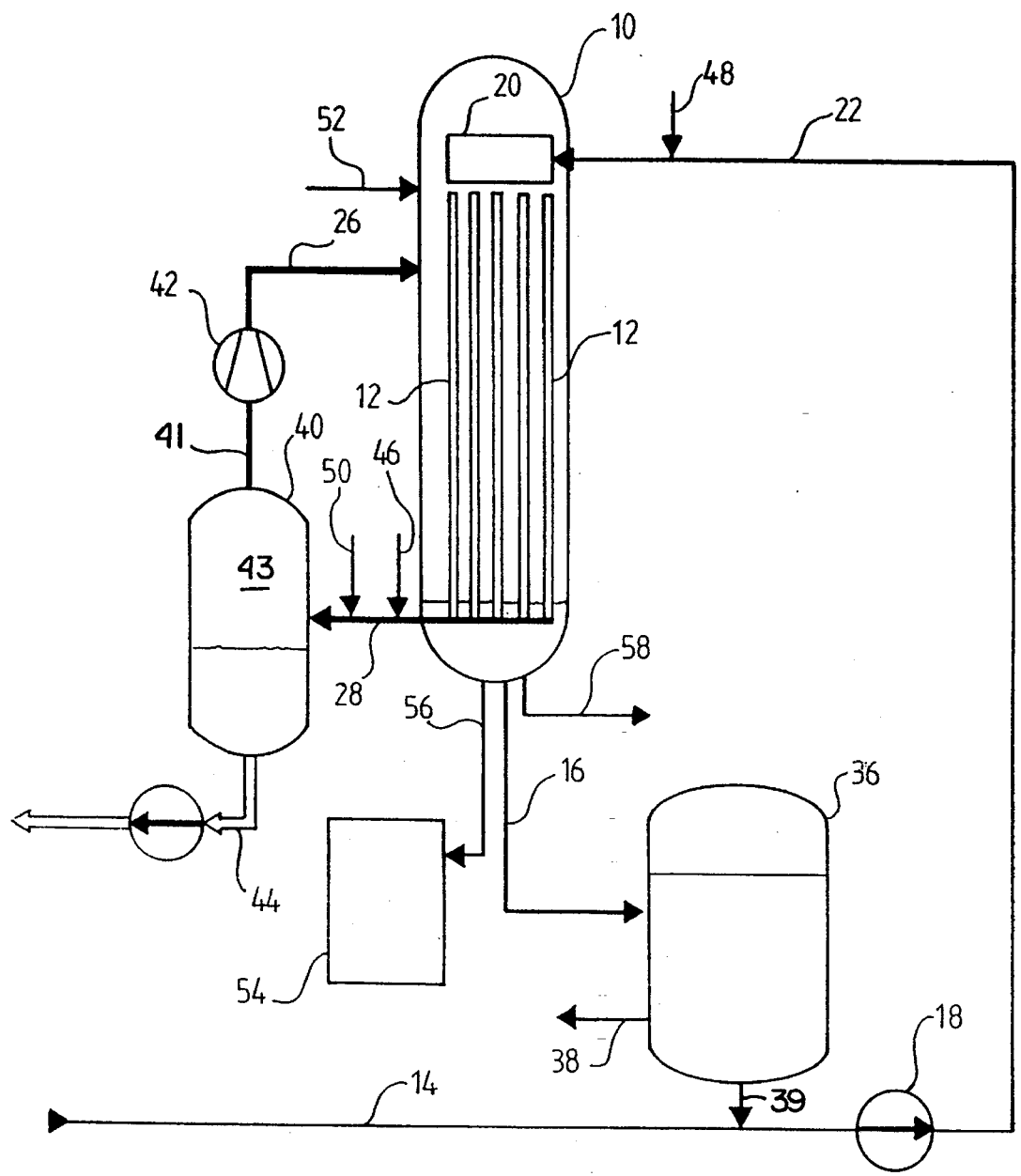
FIG. 1 schematically illustrates a preferred embodiment of an exemplary apparatus for practicing the invention.

Exemplary filtering apparatus according to the invention illustrated in FIG. 1 comprises a pressurized (i.e. superatmospheric gas-tight) vessel/housing 10, in which vertical filter elements 12 are mounted. Each filter element 12, e.g. in lamella form, preferably consists essentially of two perforated plates coated with supporting and filtering cloth. The filter elements 12 are suspended inside the vessel 10 or otherwise appropriately mounted so that filtration in accordance with the invention is possible. Each filter element 12 is preferably mounted substantially in a vertical position, having a top and a bottom, so that the liquid (suspension) film to be filtered flows downwardly along the filtering surfaces of the filter element. The filter element 12 may also be an element inclined relative to the vertical, but is generally vertical having a top positioned far enough from the bottom so that an appropriate falling film is obtained.

Figure 2:
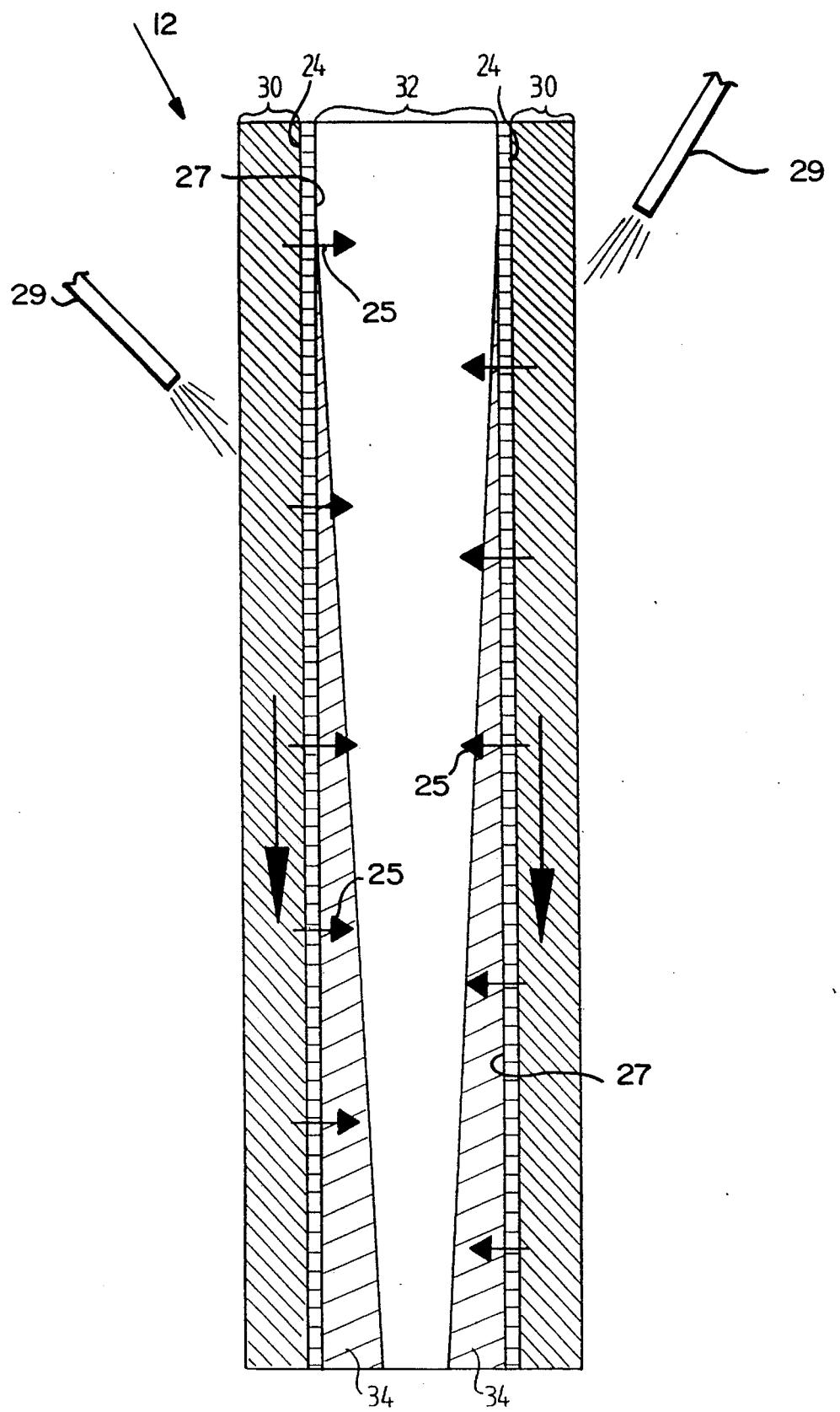
FIG. 2 schematically illustrates the principle of the filtering method according to the invention.

The suspension to be filtered is passed through an inlet conduit 14 to the recirculation system of the filter housing 10, comprising a pipe line 16, 22 and a recirculation pump 18. The suspension to be filtered is pumped by pump 18 to or adjacent the top of the filter elements 12, e.g. to a conventional tray assembly with perforated bottom plate, as shown schematically at 20. The bottom plate of the tray assembly 20 has openings at each of the filter elements 12 through which the suspension to be filtered may flow to the filtering surfaces of each filter element 12. When flowing due to the gravitational force along the filtering surfaces 24, as shown in FIG. 2, the suspension containing solids forms a dense liquid film 30 on the filtering surface 24, which film substantially prevents the pressurized gas in vessel 10 from penetrating the filtering surface. The pressurized gas passes into the vessel 10 through conduit 26. Due to the pressure difference between the first filter surface 24 and a second filter surface 27 caused by the gas, the filtrate penetrates the filter flowing from surface 24 to surface 27, and to the filtrate channel 32 surrounded by filtering surfaces 24, 27. The filtrate 34 then flows downwardly and ends up in a discharge conduit 28 in the bottom of the element 12, along which the filtrates from all filter elements 12 are discharged from vessel 10 in line 28.

The non-filtered suspension accumulates in the bottom of the vessel 10, from where it is passed through the conduit 16 to vessel 36, and is recirculated to the top of the filter elements 12 via pump 18 and line 22. In continuous filtration part of the suspension in vessel 36 is continuously discharged for further treatment through conduit 38. Alternatively or additionally the suspension in line 16 may be recirculated directly frown the bottom of the filter housing 10 without an intermediary vessel 36.

The majority of the suspension to be recirculated flows down the filtering surface 24 carrying the separated solids therewith. Thus it is possible to prevent the generation of a dregs cake on the surface 24. The amount of the suspension to be recirculated must be such that an even and continuous falling film is generated on the filtering surface 24.

During filtration the pressure difference across the surfaces 24, 27 may be reduced to remove a thin solids layer possibly attached to the filtering surface, so that the filtration slows down and the layer loosens, ultimately to be entrained with the downwardly flowing liquid. The removal of the layer may be facilitated also by reversing the pressure difference, for example, by stopping the feed of the pressurized gas from conduit 26 and by feeding pressurized gas from conduit 46 through filtrate channels 32, gas passing from surface 27 to the surface 24, loosening any formed cake.

The attachment of the solids on the filtering surface 24 may alternatively or also be prevented or removed by providing vessel 10 or elements 12 with a conventional vibration apparatus, either mechanical or acoustical. Vibration is typically initiated periodically, although there may be continuous vibration.

Under some circumstances it is desirable to—at least locally—enhance the flow volume and/or velocity of liquid in a falling film down surface 24. This may be accomplished—as illustrated schematically in FIG. 2 by reference numerals 29—by directing water (or suspension) via external nozzles or jets toward the surface 24.

While the surfaces 24 are shown in lamella form in FIG. 2 they may alternatively be in tubular, disc, or like forms.

The basic concept of cross-flow filtration is to prevent cake deposition during filtration. The resistance of the cake is thus eliminated, making it possible to filter liquors containing solids with very low cake filterability: there is no cake deposition.

The liquid to be filtered flows downwardly on the surface 24 of the filtering element 12. The pressure difference (P1–P2) across the between sides 24, 27 forces some of the liquid through the surface 24. The rest of the liquid (30) continues to flow downwards.

When some of the liquid penetrates through the element, a corresponding amount of particles try to form a cake on the element. However, the downflow continuously removes the cake. The situation can be expressed in the following form:

The force keeping the particle on a filter pore is:

$$FP=Ap*(P1-P2)*Y$$

where

Ap=pore area

P1–pressure

P2=pressure on filtrate side

Y=friction factor

The force moving the particle downwards is $$Ff=Af*V^2*K$$

where

Af=free area for flow to act on

V=flow velocity

K=constant for liquor and particle shape

If Ff>Fp the particle joins the flow and no cake is deposited.

Some particles always enter the pores, so that the area for the flow force is too small and the particle is then entrapped in the hole. The particle can become detached and join the stream if force Fp is reduced or Ff is increased. Fp is easily reduced by occasionally allowing the pressure difference P1–P2—which is normally significantly greater than 0 (e.g. at least one psi)—to go to 0. This means that the downflow removes the fixed particles.

Because of differences in the liquid being filtered, particle size, and composition of the filter surfaces 24, it is difficult to accurately quantify a desired range of pressure differential (P1–P2) between the sides 24, 27. What is susceptible to quantification, however, is the downward flow rate of liquid (30) over the surfaces 24. The flow rate must be significantly faster than the flow rate through the filter surfaces 24. For green liquor filtration, tests show that the ratio of downward flow velocity V of the liquid to through-surface flow (see arrows 25 in FIG. 2) average velocity $V_s$ should be about 8:1 (e.g. $V:V_s$ preferably=8:1, typically at least 5:1).

In batch filtration processes the apparatus in accordance with FIG. 1 operates in the following way: The sludge vessel 36 is filled with the suspension to be filtered through conduit 14 either through the filter (conduits 22 and 16) or by feeding it directly through conduit 39 (in the direction opposite the normal direction of flow illustrated by the arrow in FIG. 1), to the vessel 36. After filling the vessel 36 filtration is begun by recirculating the suspension by the recirculation pump 18. The filtrate flows to the vessel 40. More suspension is supplied through conduit 14 according to the material level in the sludge vessel 36. Sludge is not removed from the vessel 36, but it is allowed to thicken therein.

When the desired dregs concentration is achieved in the vessel 36, the bottom of the filter housing 10 is closed and the recirculation pump 18 pumps the content of the vessel 36 to the vessel 10. Due to the pressure difference prevailing in the filter 12 the filtrate is pressed through the filtering surface 24 and a cake is generated on the surface 24. At the end of the filtering cycle the non-filtered suspension is removed from the filter housing 10 and returned to the vessel 36 through conduit 16. When the pressure difference prevails, the cake remains on the surface 24 of the filtering element 12. Gas flowing through surface 24 removes water, drying the cake. The generated cake is removed by washing with water, which may be supplied, for example, through conduit 48 to the upper end of the elements 12 or through conduit 50 from the inner part of the filter elements 12. Also air or other gas may be blown through conduit 46 to loosen the cake. The dregs-water mixture is removed from vessel 10 and directed to a separate open dregs vessel 54 through line 56.

Now the filter vessel 10 is ready to begin a new filtering cycle.

It is also possible to carry out washing of the dregs in the same filter housing 10. There, prior to the removal of the dregs cake, conduit 16 is closed, and vessel 10 is filled with water through conduit 48, 50 or 52. The wash water filtered through the cake is discharged to a separate wash water vessel (not shown) through line 58. After washing the dregs cake is removed as described above.

The process may be further improved in such a way that the cake is removed dry. Consequently, after the removal of the washing water and the drying of the cake (via gas introduced through conduit 26) the cake is removed from the filtering surface 24 by blowing gas through conduit 46, whereby the gas passes through the inside of the elements 12 forcing the cake to the bottom of the vessel 10, from which the cake may be removed, for example, by opening the bottom end of the vessel 10.

Figure 3:
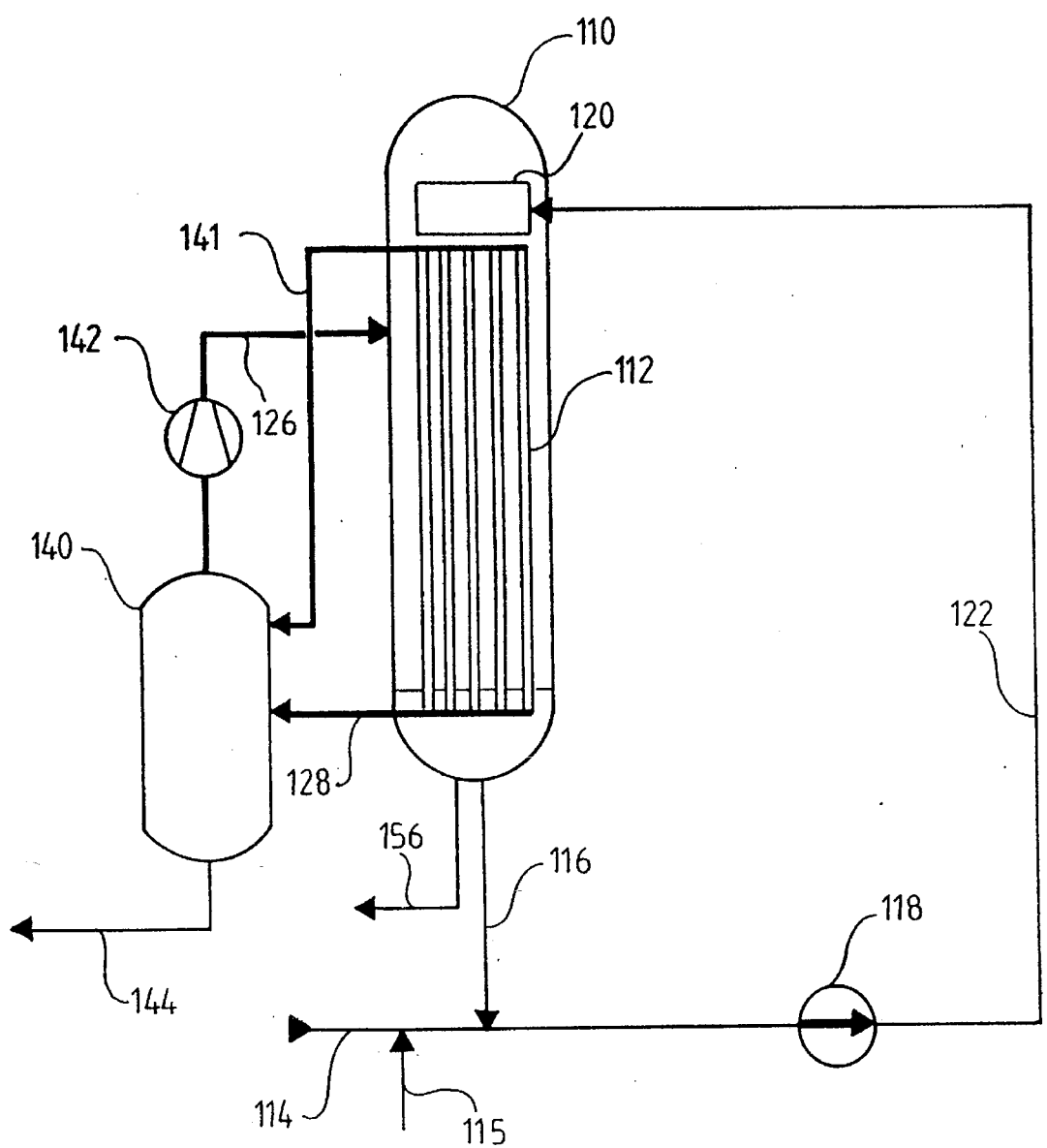
FIG. 3 schematically illustrates a second exemplary embodiment of apparatus for practicing the invention.

FIG. 3 shows how batch filtration may be carried out in another way, if less dregs washing than that in the above described filtration is sufficient, whereby no filtration cake is formed during washing. Structures in the FIG. 3 embodiment similar to those in FIG. 1 are shown by the same reference numeral only preceded by a "1".

The suspension to be filtered is passed through conduit 114 to the recirculation system of the filter, which system comprises a pipe line 116, 122 and a recirculation pump 118. Sludge is not discharged during the filtration cycle, but it is allowed to thicken and accumulate in the lower part of the filter housing 110. Also the feed of the suspension to be filtered from line 114 is stopped in order to thicken the sludge. Then wash water is supplied from line 115. Filtration is continued, whereby sludge is recirculated and wash water mixed with the dregs removes impurities, such as alkali in the treatment of green liquor, from the dregs. Also a second cleaning effect is achieved with the wash water, when the water (filtrate) passing through the filtering surface 24 washes the filtering surface 24 and thus improves the filtration capacity (in other words the surface is cleaned for the next filtration cycle). After sufficient washing, the dregs are discharged for further treatment through line 156, whereafter a new filtration cycle may begin.

In an apparatus in accordance with FIG. 1 a filtrate flow from the lower end of each of the elements 12 is passed through conduit 28 to a separator vessel 40, in which the gas (possibly entrained with filtrate) is separated. Conduit 28 is an inlet to vessel 40, conduit 41 a gas outlet, and 43 a gas volume in vessel 40. The separated gas is passed through outlet 41 and a compressor 42 in outlet back to the pressure vessel 10 (through line 26) in the filtration process. The gas thus circulars in a closed system, which has the advantage that the gas does not, react with the material being filtered. The filtrate is passed from the separator 40 along conduit 44 for further treatment. In this system the compressor 42 in effect is (in combination with vessel 40) a means for applying a partial vacuum (through line 28) to the surfaces 27 of the filter elements 12; other structures could alternatively or additionally be utilized, such as a vacuum pump, venturi, eductor, or the like. The gas introduced in lines 26 may be inert with respect to the suspension to be filtered, or may be chemically reactive with respect thereto.

In the apparatus of FIG. 3 the gas which has passed through the filtering surfaces 24, 27 is discharged through the upper portions of the elements 12 in line 141, whereas the filtrate is discharged from the lower portion of the elements 12 through line 128 (as in FIG. 1). Since the gas is separated from the filtrate in the elements 12, the filtrate obtained is gas-free in line 128, and a separate gas discharge vessel is not necessary. The pressure of the separated gas is raised in the blower 142 and the gas is returned to the filter vessel 110.

A continuous 1,000-hour filtration test was performed according to the invention. The following objectives were studied during the tests:

capacity and long-term capacity trend optimization of the operation sequences filtrate and dregs characteristics.

The capacity decreased during the first 2–3 days, but could then be kept constant. During the first week dregs removal was continuous. The main parameters affecting capacity were pressure and the dregs content in the recirculation.

During the second week a batch type operation was tested. First green liquor was filtered for a certain period without dregs removal. Then the green liquor feed was closed and the sludge was allowed to thicken. Hot water was then fed in and the dregs and cloth were washed. Dregs were removed after washing and green liquor filtration was restarted. The time required for washing was less than 10% of the total operating time. The net filtration capacity was double that of the feed-and-bleed mode.

Batch operation was then maintained during the rest of the test. The filtrate was clean during the whole test. No solids were found with the standard methods of measurement.

During normal operation the consumption of compressed air was negligible. No oxidation of sulphide was measured within the limits of the titration accuracy.

The final solids content of the dregs slurry varied from 60 to 120 g/l depending on the filtration period. The limiting factor was the recirculation pump. The dregs alkali content depends on the amount of washing water. Dilution type washing is naturally not as efficient as displacement washing.

Typical contents of some NPEs in the filtrate are shown in Table I. Samples of green liquor were also filtered and analyzed in the laboratory using a standard method. The non-process element content of the filtrate was about the same as in the laboratory filtrate.

TABLE I

| Non-Process Elements in Filtered Green Liquor | | |
| --- | --- | --- |
| Element | Filtrate mg/l | Lab. filtrate mg/l |
| Al | 2.6 | 6.5 |
| Mn | 0.8 | 0.4 |
| Fe | 0.8 | 0.8 |
| Mg | 0.06 | 0.04 |
| Ca | 1.2 | 1.9 |

The following advantages are achieved with the present invention when applying it during the filtration of green liquor or like suspensions:

the cleanliness of the green liquor to be filtered is improved and more uniform [the settling and separation of the dregs in the green liquor varies in a conventional clarifier];

the sludge volumes to be treated are smaller than in a conventional clarifier, because the dregs content is higher. [The sludge volumes to be treated according to the invention are approximately 1/5 of the corresponding sludge volume in a conventional clarifier.];

the filtering apparatus requires considerably smaller floor space than a conventional clarifier;

no filtering aids are required;

filtering capacity is higher compared with conventional cake filtration;

if a batch process is used, longer filtration cycles are obtained than when using known batch filtration methods, such as the conventional cake filtration method;

cleaning of green liquor and the treatment of the dregs separated therefrom is possible in the same apparatus (the cake may be removed dry) [i.e. no separate dregs washing apparatus is required]; and dilution washing of green liquor dregs is possible, so that the treatment thereof with the actual dregs filter is facilitated.

While the invention has been described in connection with what is presently considered to be the most practical and preferred embodiment, it is to be understood that, the invention is not to be limited to the disclosed embodiment, but on the contrary, is intended to cover various modifications and equivalent arrangements included within the spirit and scope of the appended claims.

What is claimed is:

1. A method of filtering a suspension of solids in a liquid, using a filter surface having first and second sides and a generally vertical orientation, comprising the steps of:

(a) causing the suspension to flow in a falling film down the first side of the filter surface in contact therewith so that the formation of a filter cake is substantially precluded throughout filtering;

(b) providing a higher gas pressure on the first side of the filter surface than on the second side of the filter surface, so that filtrate passes through the filter surface to the second side of the filter surface, while solids remain in the liquid flowing down the filter surface first side;

(c) withdrawing the filtrate away from the filter surface; and (d) withdrawing the liquid with suspended solids away from the filter surface.

2. A method as recited in claim 1 wherein step (b) is practiced by supplying gas under superatmospheric pressure to the first side of the filter surface.

3. A method as recited in claim 2 wherein step (b) is also practiced by applying a partial vacuum to the second side of the filter surface.

4. A method as recited in claim 3 using a vessel having an inlet, an outlet, a gas volume, and a gas compressing device connected to the outlet; and wherein step (b) is practiced by causing gas from the second side of the filter surface to pass into the vessel through the vessel inlet, to pass out of the vessel through the vessel outlet, to be compressed by the gas compressing device, and to be passed toward the first side of the filter surface.

5. A method as recited in claim 2 wherein step (b) is further practiced by supplying as the gas, gas that is inert to the suspension.

6. A method as recited in claim 1 wherein the filter surface has a top and a bottom; and wherein step (a) is practiced by recirculating the liquid from step (d) from adjacent the bottom to adjacent the top, to flow in a falling film down the filter surface.

7. A method as recited in claim 6 wherein steps (a)–(d) are practiced using green liquor as the suspension.

8. A method as recited in claim 7 wherein step (a) is practiced by providing a ratio of the downward flow velocity V to the filtrate flow average velocity $V_s$ through the filter surface of at least 5:1.

9. A method as recited in claim 8 wherein the ratio $V:V_s$ is about 8:1.

10. A method as recited in claim 1 comprising the further step (e) of locally intensifying the rate or volume of falling film flow of suspension over the first side of the filter surface, if necessary so as to substantially preclude the formation of a solids cake on the filter surface.

11. A method as recited in claim 10 wherein step (e) is practiced by directing one or more liquid jets toward the filter surface first side.

12. A method as recited in claim 1 comprising the further step (e) of intensifying the substantial preclusion of the formation of a solids cake on the filter by at least occasionally vibrating the filter surface.

13. A method as recited in claim 1 wherein steps (a)–(d) are practiced continuously.

14. A method as recited in claim 1 wherein steps (a)–(d) are practiced in discrete batches.

15. A method as recited in claim 1 wherein step (b) is practiced by applying a partial vacuum to the second side of the filter surface.

16. A method as recited in claim 1 wherein the filter surface is in a filter housing; and wherein steps (a) through (d) are practiced in batches, forming dregs; and comprising the further step of washing the dregs in the filter housing and then discharging the washed dregs from the filter house.

17. A method of cleaning green liquor using a filter surface having first and second sides and a generally vertical orientation, comprising the steps of:

(a) causing the green liquor to flow in a falling film down the first side of the filter surface in contact therewith so that the formation of a filter cake is substantially precluded throughout filtering;

(b) providing a higher gas pressure on the first side of the filter surface than on the second side of the filter surface, so that filtrate passes through the filter surface to the second side of the filter surface, while solids remain in the liquid flowing down the filter surface first side;

(c) withdrawing the filtrate away from the filter surface; and (d) withdrawing the green liquor away from the filter surface.

18. A method as recited in claim 17 wherein step (a) is practiced by providing a ratio of the downward flow velocity V to the filtrate flow average velocity $V_s$ through the filter surface of at least 5:1.

19. A method as recited in claim 18 wherein the ratio $V:V_s$ is about 8:1.

20. A method as recited in claim 18 comprising the further step (e) of locally intensifying the rate or volume of falling film flow of suspension over the first side of the filter surface, if necessary, so as to substantially preclude the formation of a solids cake on the filter surface.

21. A method as recited in claim 20 wherein step (e) is practiced by directing one or more liquid jets toward the filter surface first side.

22. A method as recited in claim 18 comprising the further step (e) of intensifying the substantial preclusion of the formation of a solids cake on the filter by at least occasionally vibrating the filter surface.

23. A method as recited in claim 18 wherein step (b) is practiced by supplying gas under superatmospheric pressure to the first side of the filter surface, and by applying a partial vacuum to the second side of the filter surface.

24. A method as recited in claim 17 comprising the further step (e) of locally intensifying the rate or volume of falling film flow of suspension over the first side of the filter surface, if necessary, so as to substantially preclude the formation of a solids cake on the filter surface.

25. A method as recited in claim 24 wherein step (e) is practiced by directing one or more liquid jets toward the filter surface first side.

26. A method as recited in claim 17 comprising the further step (e) of intensifying the prevention of the formation of a solids cake on the filter by at least occasionally vibrating the filter surface.

27. A method as recited in claim 17 wherein the filter surface is in a filter housing; and wherein steps (a) through (d) are practiced in batches, forming dregs; and comprising the further step of washing the dregs in the filter housing and then discharging the washed dregs from the filter house.

28. A method as recited in claim 17 wherein step (b) is practiced by supplying gas under superatmospheric pressure to the first side of the filter surface.

29. A method as recited in claim 28 wherein step (b) is also practiced by applying a partial vacuum to the second side of the filter surface.

30. A method as recited in claim 29 using a vessel having an inlet, an outlet, a gas volume, and a gas compressing device connected to the outlet; and wherein step (b) is practiced by causing gas from the second side of the filter surface to pass into the vessel through the vessel inlet, to pass out of the vessel through the vessel outlet, to be compressed by the gas compressing device, and to be passed toward the first side of the filter surface.

* * * * *